United States Patent
Edlinger

(10) Patent No.: US 7,905,940 B2
(45) Date of Patent: Mar. 15, 2011

(54) METHOD FOR REDUCING METAL OXIDE SLAGS OR GLASSES AND/OR FOR DEGASSING MINERAL MELTS, AND DEVICE FOR CARRYING OUT SAID METHOD

(75) Inventor: Alfred Edlinger, Bartholomäberg (AT)

(73) Assignee: SGL Carbon SE, Wiesbaden (DE)

( * ) Notice: Subject to any disclaimer, the term of this patent is extended or adjusted under 35 U.S.C. 154(b) by 574 days.

(21) Appl. No.: 11/794,527

(22) PCT Filed: Jan. 19, 2006

(86) PCT No.: PCT/AT2006/000028
§ 371 (c)(1),
(2), (4) Date: Jun. 29, 2007

(87) PCT Pub. No.: WO2006/079132
PCT Pub. Date: Aug. 3, 2006

(65) Prior Publication Data
US 2009/0266200 A1   Oct. 29, 2009

(30) Foreign Application Priority Data
Jan. 27, 2005   (AT) .............................. GM45/2005 U

(51) Int. Cl.
*C22B 7/04* (2006.01)
(52) U.S. Cl. .................. 75/10.14; 75/10.4; 75/10.62
(58) Field of Classification Search ............... 75/10.14, 75/10.62, 10.59, 375, 380, 10.4; 373/148, 373/138, 154
See application file for complete search history.

(56) References Cited

U.S. PATENT DOCUMENTS

| | | | | |
|---|---|---|---|---|
| 3,908,072 A | * | 9/1975 | Collin | 75/10.15 |
| 3,939,297 A | * | 2/1976 | Aylard et al. | 373/142 |
| 3,948,640 A | * | 4/1976 | Elvander et al. | 75/10.17 |
| 4,072,504 A | * | 2/1978 | Perdahl et al. | 75/499 |
| 5,479,436 A | * | 12/1995 | Hashida et al. | 373/144 |
| 5,781,581 A | * | 7/1998 | Fishman et al. | 373/152 |
| 6,206,948 B1 | | 3/2001 | Fourie | |

FOREIGN PATENT DOCUMENTS

| | | |
|---|---|---|
| CH | 618 107 | 7/1980 |
| DE | 20203213 U1 * | 9/2002 |
| EP | 0 820 962 A1 | 1/1998 |
| EP | 1 493 830 A1 | 1/2005 |
| JP | 02093287 A | 4/1990 |
| JP | 05074558 | 3/1993 |
| JP | 2000-186892 * | 7/2000 |
| JP | 2000-346560 * | 12/2000 |
| WO | WO 97/20958 | 6/1997 |

OTHER PUBLICATIONS

Machine translation of JP 2000-346560, published Dec. 2000.*

* cited by examiner

*Primary Examiner* — George Wyszomierski
*Assistant Examiner* — Tima M McGuthry-Banks
(74) *Attorney, Agent, or Firm* — Chapman and Cutler LLP

(57) ABSTRACT

In a method for reducing metal-oxidic slags or glasses and/or degassing mineral melts, solid particles and/or melts are charged onto an at least partially inductively heated bed or column containing lumpy coke, and the reduced and/or degassed melt running off is collected. The device for reducing metal-oxidic slags or glasses and/or degassing mineral melts, which includes a charging opening (1) for solid or molten material and a tap opening (12) for the treated melt, is characterized by a tubular or channel-shaped housing (3) for the reception of lumpy coke (6), and a heating means surrounding the housing and including at least one induction coil (7, 8, 9).

4 Claims, 2 Drawing Sheets

Figure 1:
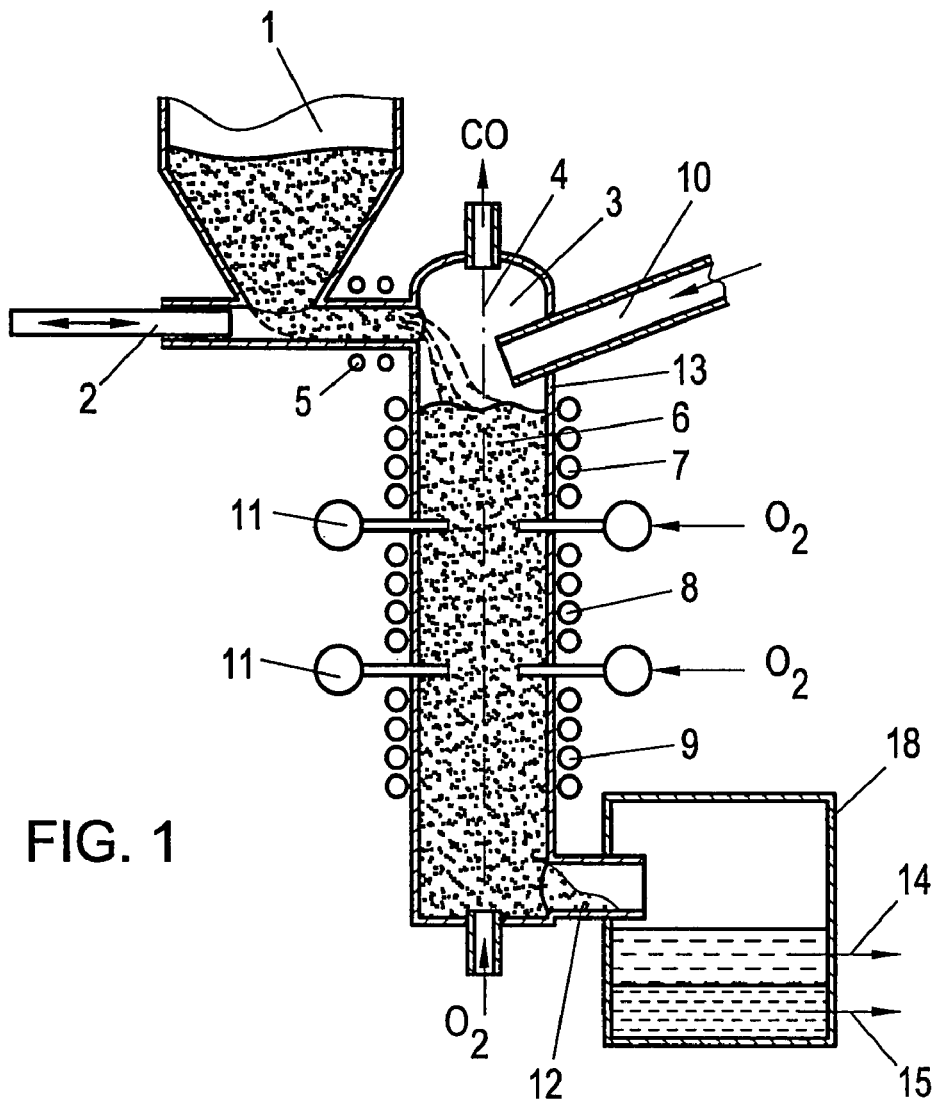

METHOD FOR REDUCING METAL OXIDE SLAGS OR GLASSES AND/OR FOR DEGASSING MINERAL MELTS, AND DEVICE FOR CARRYING OUT SAID METHOD

The invention relates to a method for reducing metal-oxide-containing slags or glasses and/or degassing mineral melts as well as device for carrying out said method, including a charging opening for solid or molten material and a tap opening for the treated melt.

Dusts and slags, particularly waste slags, steel slags as well as slags derived from non-iron metallurgy and inorganic technology, contain a number of metal oxides with considerable amounts of heavy-metal oxides being contained in the slag in the event of steel slags. In order to reduce such undesired metal oxides and, in particular, chromium oxides, vanadium, molybdenum, tungsten, cobalt, manganese, lead and zinc oxides, it has already been proposed to charge liquid melts onto a suitable reducing metal bath and, in particular, iron bath, which contains free carbon as a reductant and causes the reduced metals to pass into the metal regulus. For the economic implementation of such a method, it is, however, necessary in most cases to use the starting materials directly as melts in order to be able to utilize the sensible heat of the melt. With all such redox reactions, the slag is furthermore in equilibrium with the metal bath and, on account of the conditions of equilibrium, heavy-metal oxides will never be completely reduced in a manner in which the oxides remaining within the slag would be below the analytical detection limit. This applies particularly to chromium oxide, which would remain in reduced slags in quantities usually exceeding 1000 ppm.

It will be possible to produce glasses and, in particular, glass melts in a colorless manner only if even extremely slight traces of heavy-metal oxides are quantitatively removed from such glass melts, since metal oxides impart respective colors to the glass. When processing glass or glass melts, fining is, as a rule, further required to reliably remove even the finest gas bubbles as are also formed in reduction processes aimed to eliminate metal oxides. This is feasible only at accordingly high temperatures and with accordingly low-viscous melts as well as relatively low bath levels still enabling the escape of gases.

The invention aims to provide a method of the initially defined kind, by which, in a particularly simple and economic manner, not only solid substances but also melts can be largely freed of heavy-metal oxides quantitatively and, in particular, a number of heavy-metal oxides can be eliminated down to below the detection limits while, at the same time, ensuring the complete degassing or fining of the melt charged or formed in the course of the process.

To solve this object, the method according to the invention essentially consists in that solid particles and/or melts are charged onto an at least partially inductively heated bed or column containing lumpy coke, and the reduced and/or degassed melt running off is collected. Since a column or bed containing lumpy carbon carriers is at least partially inductively heated, substantially higher temperatures will be attained with coke than would be the case if carbon carriers were burned. Furthermore, such a glowing column or glowing coke bed is characterized by a substantially higher redox potential, since the carbon is actually not in thermal equilibrium with combustion products and, in particular, CO and $CO_2$. If solid particles are charged onto such a column or bed containing highly heated lumpy coke, the respective melting procedure will immediately occur simultaneously causing the desired reduction of metal oxides. The same naturally applies to the charging of already melted material, whereby reactions as are observed only in thin-layer reactors are, at the same time, rendered feasible due to the fact that, because of the envelopment of the lumpy coke, the in-situ formed melt, or the charged melt, will enter into contact with the glowing coke in relatively thin layers. This holds, in particular, for the rapid and reliable degassing or fining of melts as is especially desirable when using glass melts.

It is, thus, essential for the method according to the invention that highly heated, glowing lumpy coke is used, the heating of which is effected inductively at least in part. If gases are blown into such an inductively heated bed or inductively heated column containing coke, as in correspondence with a preferred mode of operation, the redox potential of the bed is controllable within wide limits. The blowing in of oxygen-containing gases causes the partial combustion of the glowing carbon carriers and, hence, the formation of CO and $CO_2$, whereby the redox potential is accordingly reduced, thus enabling a mode of operation by which only nobler metals are reduced from their metal oxides, while less noble metals will remain in the melt. At the same time, such a gas supply, in addition to the adjustment of the redox potential, also enables a change in temperature in order to recondensate volatilizing substances in the respective regions of the column or bed. The temperature of the bed in a particularly simple manner can be controlled by changing the electric power input during the inductive heating so as to enable an overall process control taking into account a large number of different parameters, using a simple and relatively small-structured reactor. At accordingly high temperatures, it is feasible to reduce chromium and vanadium in a particularly simple manner, whereby, due to the glowing carbon carriers, optionally formed carbides will enter into the metal regulus formed by the reduction and, hence, into the metal melt. Overall, it has been shown that, by the reduction over a glowing coke column whose temperature is adjusted by inductive heating, both chromium and vanadium might be reduced from the mineral melts in quantities in which they are still present in the mineral melts only below the detection limits. With the carbon monoxide formed by reduction, after-burning may be effected on top of the column, which will, at the same time, result in optionally formed zinc being oxidized to zinc oxide in the $CO/CO_2$ equilibrium established by the combustion of CO, thus directly providing a product that is easier to utilize from an economic point of view. If Zn vapor is drawn off with CO at temperatures above the condensation point of Zn, it will be feasible upon preheating of the coke in a bunker provided above the charging chute to draw Zn off the bunker as a running-off melt.

In order to reduce the redox potential, as in accordance with a preferred further development of the method according to the invention, it is preferably proceeded in a manner that oxygen-containing gases are blown in. Alternatively, inert gases, $CO_2$ and/or $H_2O$ vapor and/or $C_xH_y$ vapor may, of course, be injected, if the temperature of the bed or column is to be influenced in the first place. Glass particles or glass melts may preferably be directly charged onto the glowing coke, thus ensuring the rapid degassing or fining of the glass melts in the course of the method according to the invention at accordingly elevated temperatures on account of the relatively thin layer. In the main, temperatures of 2000° C. and more will readily be attained with an inductively heated bed or column containing lumpy carbon carriers, since a cooling effect by the thermal dissociation of the oxidation products is avoided. The use of lumpy material, above all, serves to ensure the desired permeability for gas and liquid melts.

A further, particularly advantageous, way of influencing the temperature of the coke bed or coke column is realized in that the frequency of the induction current is lowered with the amount of melted and reduced, molten material increasing in the region of efficiency of the induction coils. In this manner, the fact is taken into account that slag melts dissociate and exhibit an increasingly higher electric conductivity during the reduction to a metal bath, thus thermally coupling at a decreasing frequency. Departing from, for instance, 50 kHz, the frequency can be lowered to approximately 20 kHz, and in the region of a metal bath to below 10 kHz, with a dissociating slag in order to maintain the dissipated energy and the melt heat, respectively.

The device according to the invention, for reducing metal oxides and/or degassing melts is equipped with a charging opening for solid or molten material and a tap opening for the treated melt. In accordance with the invention, a device of this type is essentially characterized by a tubular or channel-shaped housing for the reception of coke and a heating means surrounding said housing and including at least one induction coil. To adjust the redox potential, or for local cooling, the configuration is preferably devised such that gas feed ducts are connected to the housing. In a particularly simple manner, the configuration may be devised such that the tubular housing is comprised of an electrically insulating material such as, e.g., $Al_2O_3$, or at least an electrically insulating foil, and encompassed by a cooled induction coil. Such an electrically insulating foil may, for instance, be formed by high-temperature-resistant paper foils, the mechanical support of which is initially provided by the usually water-cooled induction coil. When charging molten material or forming melts, the electrically insulating foil is rapidly coated with a slag or melt skin, since the induction coil is accordingly cooled, whereby the mechanical stability of the column is substantially improved and refractory material problems are, at the same time, completely eliminated.

The lumpy coke may already be preheated prior to being charged into the tubular housing and may be continuously recharged at an accordingly high consumption. In this respect, the configuration is advantageously devised such that a charging chute for lumpy coke opens into the tubular housing.

In order to enable an easy change of the temperature of bed or column sections, the configuration is advantageously devised such that the induction coil is designed to be subdivided into several sections in the axial direction of the tubular housing, wherein separate temperature-measuring means and/or electric power input measuring means are provided for axially consecutive sections of the tubular housing, and that the temperature is controllable in distinct sections by adjusting the electric power and/or the gases and/or gas volumes to be blown in.

In order to utilize the hot combustion gases formed during the charging of melts and, in particular, the sensible heat of CO to preheat coke and to condensate possibly formed gaseous metal vapors, a preheating zone is advantageously provided. To this end, the configuration is advantageously devised such that a tube immersed in the coke bed or coke column and surrounded by coke is arranged in the interior of the tubular housing so as to be connected with the solid particle or slag melt or glass charging means.

Figure 2:
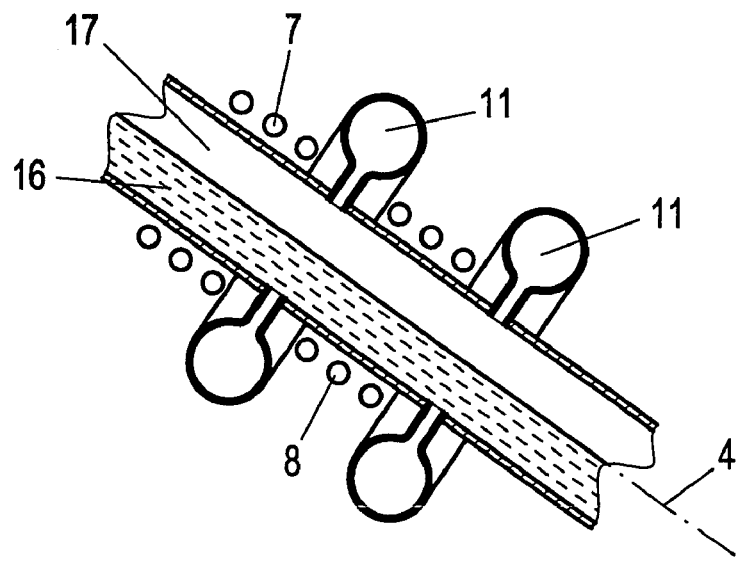
Figure 3:
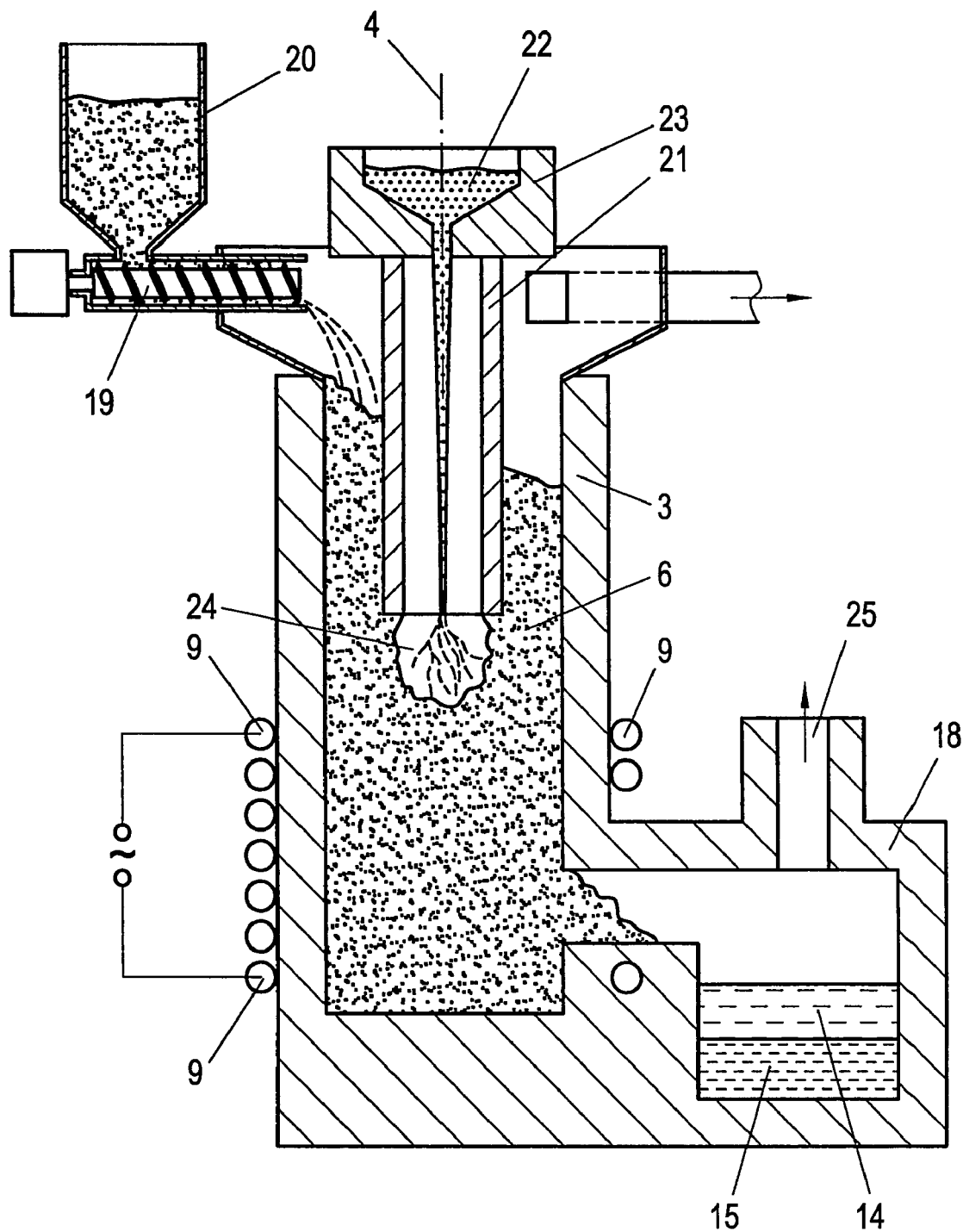

In the following, the invention will be explained in more detail by way of exemplary embodiments of the device according to the invention, which are schematically illustrated in the drawing. Therein, FIG. 1 illustrates a configuration of a reactor containing a coke column;

FIG. 2 depicts a modified reactor configuration in the form of a chute containing a heated coke bed; and FIG. 3 shows a further, modified reactor in a sectional illustration corresponding to that of FIG. 1.

In FIG. 1, a charging bunker for coke is denoted by 1, from which coke is ejected via a dosing plunger 2 into a reactor 3, whose axis is denoted by 4. On the site of injection, or in the region of the charging chute, induction coils 5 are visible, via which the coke is preheated. In this region, coke may, however, also be preheated in a gasifying manner by being burned with oxygen. The coke bed bulk 6 is heated by induction coils 7, 8 and 9, with the preslag or slag melt being charged via charging channel 10. Via this channel 10, accordingly lumpy material may naturally be charged at an accordingly high heating of the coke bed, which material is subsequently melted in the coke bed or within the bulk. When charging preslag melts as may, for instance, occur from any processes in which molten slags occur, the temperature of the coke column essentially corresponds with the temperature of the slag melt. Via annular channels 11, gases and, in particular, oxygen may be injected to enable a change in the redox potential, on the one hand, and an influence of the temperature, on the other hand. Thus, both a redox gradient and a temperature gradient can be adjusted over the axial length, i.e., in the longitudinal direction of the axis 4 of the reactor so as to enable the tapping of iron-oxide- and heavy-metal-oxide-free slag and metal in the region of the slag tap 12 such that refractory problems will no longer occur on that site too. The wall 13 of the housing of the reactor 3 may be formed by simple refractory foils, which are spattered with melt during melting and running down of the melt, thus providing an appropriate slag or melt skin. The coils 7, 8 and 9 are designed as water-cooled copper conductors, safeguarding the respective cooling of the wall and, hence, the formation of the slag and melt skin deposit. The material drawn off via the tap opening 12 reaches a forehearth 18, in which the slag can be separated from metal by sedimentation, the slag tap being denoted by 14 and the metal tap being denoted by 15.

In principle, the axis 4 of the reactor may be oriented vertically so as to allow the formation of a reactor column or a glowing coke column. As is apparent from the illustration according to FIG. 2, the coke reactor may, however, also be designed to have an oblique axis with a respective gas space 17 remaining above the coke bulk 16. Also in this configuration, gas may be injected in different cross sectional planes via annular channels 11 so as to enable the adjustment of a redox and a temperature gradient via the axial length of the reactor along with the respective power control of the coils 7, 8 and 9. With an obliquely arranged reactor, a suitable gas space 17 will be provided as already mentioned above, such a configuration being of particular advantage where large amounts of atmospheric heavy metals, i.e. metals evaporating in the reduced state, are present.

In FIG. 3, a vertically arranged reactor 3 with its axis 4 is again illustrated. The coke is drawn off the bunker 20 via a screw 19 and injected into the reactor 3. A tube 21 via which a melt 22 is charged from a tundish 23 is immersed into the coke 6. Material evaporating from the cavity 24 is condensed in the upper region of the coke column surrounding the tube 21 or serves to preheat the coke if remaining gaseous like, e.g., CO. The induction coils, in turn, are denoted by 9 with a forehearth 18 being connected, from which the metal regulus and slag can be tapped separately. Metal vapors can be extracted through chimney 25.

Common to all rectors is the good preseparation of the metal melt and the good coverage of the coke particles by the metal melt. The reduced slag melt preferably remains on the coke bed surface, with a particularly good separation of the slag phase from the metal-melt being feasible also because of their most largely differing viscosities and different densities. Slag melts, as a rule, have high viscosities, thus adhering better to the coke bed than the low-viscous and, hence, substantially more readily flowable metal melts.

Afterburning at the end of charging, by which CO is burned to $CO_2$, is basically feasible, leading to an increase in efficiency by the feeding of fossil heat. The coke bed surface is in this case covered by the slag melt such that Buoduar reactions will be largely suppressed. Overall, a substantially higher degree of direct reduction by which metal oxides react with carbon to form liquid metals and carbon monoxide will be achieved with the glowing coke bed. No $CO_2$ is formed in this direct reduction as opposed to indirect reduction, which might result in an undesired reslagging or reoxidation, particularly in the event of V and Cr, on account of the respective $CO_2/CO$ partial pressure prevailing.

Moreover, the metal melt formed within the coke bed is carburized by the coke bed and/or forms soluble carbides such as, e.g., carbides of the metals iron, vanadium, chromium or tungsten, within the metal bath. In principle, it is feasible to reduce chromium out of slags to below 60 ppm even with relatively short coke columns.

In general, liquid slags of different origin can be employed, it being above all feasible to reduce iron oxide, phosphorus oxide, zinc oxide, lead oxide, manganese oxide, copper oxide, vanadium oxide and chromium oxide in a simple manner. The slag reduction itself is endothermic, thus calling for a respective supply of heat, or supply of electric energy, to the coke bed reactor. Due to the good electric conductivity of coke, a high energy efficiency is achieved. It is to be noted that the reduction potential of glowing coke rises with increasing temperatures, whereas the oxygen affinity of metals decreases with increasing temperatures, from which the excellent reduction performance results.

The invention claimed is:

1. A method for reducing metal-oxidic slags or glasses, or for degassing mineral melts, comprising the steps of:
    charging at least one of solid particles and melted materials onto an at least partially inductively heated bed or column of lumpy coke, thereby producing a treated melt that is at least one of reduced and degassed, and
    collecting said treated melt, wherein
    at least one of said solid particles or melted materials are comprised of glass, and are charged onto glowing coke,
    a redox potential of the bed or column is controlled by blowing gases directly into the bed or column, and
    a temperature of the bed or column is controlled by changing electric power intake and by blowing gases directly into the bed or column.

2. A method according to claim 1, wherein said gases are oxygen-containing gases.

3. A method according to claim 1, wherein a frequency of an induction current is lowered as an amount of melted material increases in a region of efficiency of induction coils heating the bed or column.

4. A method for reducing metal-oxidic slags or glasses, or for degassing mineral melts, comprising the steps of:
    charging at least one of solid particles and melted materials onto an at least partially inductively heated bed or column of lumpy coke, thereby producing a treated melt that is at least one of reduced and degassed, and
    collecting said treated melt, wherein said at least one of solid particles or melted materials are comprised of glass, and are charged onto glowing coke.

* * * * *